(12) United States Patent
Hunukumbure et al.

(10) Patent No.: US 9,769,172 B2
(45) Date of Patent: Sep. 19, 2017

(54) METHOD OF ACCESSING A NETWORK SECURELY FROM A PERSONAL DEVICE, A PERSONAL DEVICE, A NETWORK SERVER AND AN ACCESS POINT

(71) Applicant: FUJITSU LIMITED, Kawasaki-shi, Kanagawa (JP)

(72) Inventors: Rajaguru Mudiyanselage Mythri Hunukumbure, Hillington (GB); David Snelling, Bucks (GB); Roger Menday, Guildford Surrey (GB)

(73) Assignee: FUJITSU LIMITED, Kawasaki (JP)

( * ) Notice: Subject to any disclaimer, the term of this patent is extended or adjusted under 35 U.S.C. 154(b) by 173 days.

(21) Appl. No.: 14/319,088

(22) Filed: Jun. 30, 2014

(65) Prior Publication Data
US 2015/0074769 A1    Mar. 12, 2015

(30) Foreign Application Priority Data

Sep. 6, 2013   (EP) .................................... 13183447

(51) Int. Cl.
| | |
|---|---|
| H04L 29/06 | (2006.01) |
| H04W 88/08 | (2009.01) |
| H04W 12/08 | (2009.01) |
| H04W 48/20 | (2009.01) |

(52) U.S. Cl.
CPC ........ H04L 63/101 (2013.01); H04L 63/0272 (2013.01); H04W 12/08 (2013.01); H04W 48/20 (2013.01); H04W 88/08 (2013.01)

(58) Field of Classification Search
CPC .... H04W 48/20; H04W 84/045; H04L 63/101
See application file for complete search history.

(56) References Cited

U.S. PATENT DOCUMENTS

| | | | |
|---|---|---|---|
| 7,797,530 B2* | 9/2010 | Moineau | H04L 63/0227 370/351 |
| 2005/0272430 A1* | 12/2005 | Griebling | H04W 84/22 455/446 |

(Continued)

FOREIGN PATENT DOCUMENTS

| | | |
|---|---|---|
| JP | 10-285628 | 10/1998 |
| JP | 2003-008781 | 1/2003 |

(Continued)

OTHER PUBLICATIONS

Deny all, permit some; Matt Prigge; Infoworld; Jan. 11, 2010.*

(Continued)

*Primary Examiner* — James Turchen
(74) *Attorney, Agent, or Firm* — Staas & Halsey LLP (57) ABSTRACT

A method of accessing a network securely using a personal device which can only access the network via one or more authorized access points, the method including establishing a connection between the network and the personal device via an access point; checking in the network whether the access point is on a white list of authorized access points for use with the network; if the access point is on the white list, allowing the personal device to access the network securely via the access point; and if the access point is not on the white list, not allowing the personal device to access the network securely.

16 Claims, 7 Drawing Sheets

(56) References Cited

U.S. PATENT DOCUMENTS

| | | | | |
|---|---|---|---|---|
| 2006/0043164 | A1* | 3/2006 | Dowling | G06Q 20/04 235/375 |
| 2008/0049702 | A1* | 2/2008 | Meylan | H04W 48/20 370/342 |
| 2008/0254833 | A1* | 10/2008 | Keevill | H04L 12/5692 455/558 |
| 2009/0007229 | A1* | 1/2009 | Stokes | G06F 21/6218 726/2 |
| 2009/0082020 | A1* | 3/2009 | Ch'ng | H04W 48/20 455/435.3 |
| 2009/0093232 | A1 | 4/2009 | Agashe et al. | |
| 2009/0094680 | A1* | 4/2009 | Gupta | H04L 63/104 726/3 |
| 2010/0049783 | A1* | 2/2010 | Ryman | H04L 67/14 709/202 |
| 2010/0049797 | A1* | 2/2010 | Ryman | H04L 67/125 709/203 |
| 2010/0161960 | A1* | 6/2010 | Sadasivan | H04L 63/1408 713/152 |
| 2010/0265827 | A1* | 10/2010 | Horn | H04W 72/10 370/241 |
| 2011/0051658 | A1* | 3/2011 | Jin | G01S 19/48 370/328 |
| 2011/0116442 | A1* | 5/2011 | Caldwell | H04W 12/08 370/328 |
| 2011/0252237 | A1* | 10/2011 | PalChaudhuri | H04L 9/3226 713/168 |
| 2012/0096519 | A1* | 4/2012 | Alanara | H04L 63/123 726/3 |
| 2012/0170513 | A1* | 7/2012 | Vogedes | H04W 24/02 370/328 |
| 2012/0196641 | A1 | 8/2012 | Suzuki | |
| 2012/0236760 | A1* | 9/2012 | Ionescu | H04W 4/22 370/259 |
| 2012/0251076 | A1* | 10/2012 | Stewart | H04N 5/913 386/252 |
| 2013/0090115 | A1* | 4/2013 | Deivasigamani | H04W 48/20 455/434 |
| 2014/0032922 | A1* | 1/2014 | Spilman | G06F 21/602 713/184 |
| 2014/0150049 | A1* | 5/2014 | Kwon | H04L 63/1416 726/1 |
| 2014/0206283 | A1* | 7/2014 | Yamaguchi | H04W 4/008 455/41.1 |

FOREIGN PATENT DOCUMENTS

| | | |
|---|---|---|
| JP | 2009-147531 | 7/2009 |
| JP | 2009-181458 | 8/2009 |
| JP | 2009-181460 | 8/2009 |
| JP | 2012-129867 | 7/2012 |

OTHER PUBLICATIONS

"Critical Controls for Effective Cyber Defence; Critical-Controls 4-1", ETSI Draft; Critical-Controls 4-1, Apr. 17, 2013, pp. 1-88.
Branch, J., et al., "Autonomic 802.11 Wirless LAN Security Autditing," Security and Privacy, IEEE, May 1, 2004, pp. 56-65.
European Search Report mailed Apr. 2, 2014 in corresponding European Application No. 13183447.5-1505.
"Critical Controls for Effective Cyber Defense; Critical-Controls 4-1", ETSI Draft; Critical-Controls 4-1, European Telecommunications Standards Institute (ETSI), vol. LI, Apr. 17, 2813, pp. 1-88.
Branch J W et al: "Autonomic 882.11 Wireless LAN Security Auditing", Security 5 Privacy, IEEE, vol. 2, No. 3, May 1, 2004, pp. 56-65.

* cited by examiner

METHOD OF ACCESSING A NETWORK SECURELY FROM A PERSONAL DEVICE, A PERSONAL DEVICE, A NETWORK SERVER AND AN ACCESS POINT

CROSS REFERENCE TO RELATED APPLICATION

This application claims the benefit of European Application No. 13183447.5, filed Sep. 6, 2013, the disclosure of which is incorporated herein by reference.

BACKGROUND OF THE INVENTION

The present invention relates to network security, in particular of networks which use access points for wireless connection. In this context an access point is a network provider that can provide a wireless link to devices, such as a user device or terminal and a wired (or potentially wireless) link to a network, allowing device access to the network in question. The access point, or wireless access point (WAP) may use Wi-Fi, IEEE 802.11 or related standards. It usually connects to a router (via a wired network) as a standalone device, but it can also be an integral component of the router itself The devices can be any form of device allowing wireless connection, such as any laptop, PC, mobile or cellular telephone, personal assistant device etc. Usually the device is owned by and specific to an individual.

This invention is of particular relevance to the potential security risks for enterprise (corporate/business or firm) networks in implementing a BYOD (Bring Your Own Device) policy in the office. A BYOD policy allows employees to bring any personal device of their choice into the office or other work environment and use it for official work. While it can improve the productivity of the employees and reduce the IT related costs for the enterprise, it can open up a series of issues related to secure handling of official data.

BYOD is a novel trend sweeping through the enterprise world. This trend is powered mainly by the plethora of smart devices (working on different operating systems) now available in the market. The employees own such smart devices for their personal use and request that the same devices be used for some or all of their official work. This reduces the number of devices they have to carry and also enables them to work on a familiar device and an operating system (OS).

The IT services of the enterprise clearly cannot purchase all types of devices preferred by the employees, support their OS and also provide 3G/LTE or other wireless connectivity through different operators. The sheer complexity of this option makes BYOD much more simple and attractive. The employee has the main responsibility in managing his device and the enterprise will, for example, pay the cost of official communications. Even if the employee leaves or changes his/her role, the device and the (phone) number are still retained by the employee. BYOD is shown to improve the productivity of the employees and also shown to help increase employee satisfaction with working conditions.

Such benefits have made BYOD a trend many enterprises are willing to embrace. But the security risks involved with BYOD force many enterprises (especially ones dealing with highly sensitive data) to take a very cautious approach. They might consider the huge cost in improving traditional IT security mechanisms to offset the benefits of BYOD.

One of the key issues with BYOD security is how to ensure enterprise data security if the device gets lost, stolen or spoofed. By nature, BYOD devices will be extensively used in social events, gatherings away from work and lost/stolen devices will be a common occurrence. The key problem is how to separate the work context of the BYOD from the social and leisure context. Usually the IT security for device to server/network access (eg: through VPN) involves a two-point security check. The server checks the device authentication and also checks user authentication through a password. The problem with a lost, stolen or spoofed device is that if the passwords can be retrieved (which is not impossible to do) an intruder can simply gain access to the network using employee credentials.

A three-point security check can improve this situation. In addition to the above two checks of the user password and device, the network can require the BYOD device to perform a bio-metric check (such as a finger print, iris recognition or other physical ID) before it grants access. While this is an effective security measure, none (or very few) smart devices today contain these bio-metric checks. Even if they come to the market in future, these devices will be significantly more expensive than standard smart devices and this would drastically reduce employee choice on BYOD.

Thus it is desirable to provide a way of increasing security of network access by a personal device which does have a significant impact on device or network complexity or cost.

SUMMARY OF THE INVENTION

According to an embodiment of a first aspect of the invention there is provided a method of accessing a network securely using a personal device which can only access the network via one or more authorised access points, the method including establishing a connection between the network and the personal device via an access point; checking in the network whether the access point is on a white list of authorised access points for use with the network; if the access point is on the white list, allowing the personal device to access the network securely via the access point; and if the access point is not on the white list, not allowing the personal device to access the network securely.

The principle behind this invention embodiment is that access to the network is restricted by restricting access points available to the user and his/her personal device(s).

This embodiment is based on providing an access point (AP) authentication with a secure enterprise server/network. The server/network allows connections only to devices which route through these authenticated access points. These authenticated access points may be in the office network and also in the employee home environment. For employees with many travel commitments, the enterprise can also provide them with authenticated portable access points (such as WiFi routers or even MiFi). The basic idea is that with this AP authentication, the enterprise can restrict the locations where the BYOD device can access the office network. It greatly reduces the risk of an intrusion to the network, if the device gets lost or stolen, which mostly happens in a social interaction context. The coverage of the APs considered is preferably small and controllable which makes this solution feasible. Thus the AP may be at the level of Femto cells or WiFi APs, or MiFi (which stands for "My Wi-Fi". A MiFi device can be connected to a mobile phone (cellular) carrier and provide internet access for up to ten devices). Another alternative is the SoftAP (software-enabled AP which can be incorporated within the device itself). Of course, the portable APs lose the location dependent security advantage, while adding to flexibility of use for the owner(s) of the personal device.

From a technical context, this invention embodiment involves using authenticated APs registered in a white-list at the server/network. Every time a BYOD device requests access to the network, it should be verified that the AP through which the device connects is in this white list. The customary access methods (including VPN) can involve a hand shake protocol between the network (server) and the device, in which the device credentials are checked and the user often also has to enter a password to gain access. What this invention embodiments propose is in addition to this hand shake protocol is a protocol to authenticate the AP to provide enhanced protection. Thus the method may further include additional checks beyond the AP white list check before secure network access in granted, such as a security check including at least a personal device check and a user check.

The white list may be stored in any appropriate way, for example on board, on line, on a secure chip or in other secure memory. The white list may take any appropriate form, and preferably includes access point identification for each authorised access point. It may also include further information such as an IP address for some or all of the entries. In one preferred embodiment the white list includes specific hours and/or days of authorisation for some or all authorised access points, wherein secure access to the network is only granted if the white list check is made during the specific hours and/or days of authorisation for those authorised access points. For example access may be blocked out of office hours for an in-office AP. In these and other circumstances, such as a failed handshake or wrong user password, the access point may be authenticated, but secure access nevertheless not permitted: effectively there may be AP authentication, but authorisation does not necessarily always take place.

The access point identification itself may have any suitable format. For example, it may directly identify the access point hardware. Thus in some embodiments, the access point identification includes an access point hardware ID, preferably of the access point microprocessor.

Alternatively or additionally, the access point identification may include a configured ID, preferably an encrypted field encrypted by a private key and extracted by a public key.

Appropriate methodologies for checking the access point ID against the white list may include either the personal device or the network requesting the access point ID.

In one preferred embodiment, checking whether the access point is on the white list includes the personal device requesting the access point identification from the access point, the access point providing the identification to the personal device; and the personal device transmitting the access point identification to the network for comparison with the white list. If there is a successful white list comparison and no further security checks are required (for example if device and user checks have already been carried out) then secure network access, such as a full VPN session, may be granted. Alternatively, there may be further security checks, such as a timing check for an in-office AP, or an extra security cross-check.

In one embodiment, a step of the personal device sending the access point identification to the network is optional. The device may send an access point reference allowing the network to address the access point and the reference may include the access point identification or not. Whether or not the access point identification is provided (allowing an initial comparison with the white list), the network requests access point authentication directly from the access point, which is then transmitted to the network for a white list check before network access is granted. In this way information is provided independently of the personal device (and optionally used to corroborate the ID supplied by the personal device). This may be useful if the device is compromised.

Once secure network access has been granted it can be beneficial to continue to apply a strict security regime. One way of doing this is to wipe any data when the device is ceasing to access the network. Such data may be identified for example at an application level, by time information or by any other suitable method. Thus according to one advantageous development, once the personal device is accessing the network securely via the access point, if the personal device no longer accesses the network securely, data downloaded from the network is cleared from the personal device memory.

Another security enhancing feature relates to handover in cellular systems. Preferably, while the personal device is accessing the network via the access point and a cellular communication system, the personal device is prevented from handover to outside the current cell. In one embodiment, the access point supplies the access point authentication of any new access point to the network, for comparison against the white list.

Any suitable access point may be used. For example the access point may be a portable access point, such as a portable router, portable internet connection to a cellular communication system or a portable base station for a femto cell.

Accordingly, the connection path between the personal device and the access point may be wireless, whereas the connection path between the access point and the network may be wired, or wireless in some cases. For instance, an AP may connect to the host network wirelessly and act as an extender.

In order to set up the white list, a process may be included to register APs. Thus the method may include an initial set-up stage in which at least one access point is registered with the network and added to the list of authorised access points. This process may take place in the corporate offices, or under an existing secure access arrangement such as an existing VPN session as an "Access Corporate Resources" activity carried out using the device.

In one example, the device may request the access point ID, and provide it to the network once it is received, for registration in the white list.

Various methods of secure network access are known to the skilled person and applicable to embodiments of the invention. One method is a simple HTTPS (Hypertext Transfer Protocol Secure) browser connection such as is often used to access webmail. Another is a complete Virtual Client Solution. Possibly the most common is VPN (Virtual Private Network) access. Details of these protocols are beyond the scope of this patent. In these and other protocols, the underlying software can be extended to include the access point authentication and authorisation detailed herein.

According to some invention embodiments, the connection between the network and the personal device is a VPN connection, and the personal device accesses the network if the access point is on the white list (and if any further security checks are satisfied) using a full VPN connection or session.

According to an embodiment of a personal device aspect of the invention there is provided a personal device which is arranged to access a network only via one or more authorised access points, the personal device including a controller, a transmitter and a receiver; wherein the controller controls the transmitter and receiver: to connect to the network via an access point; and to communicate with the access point and the network to check whether the access point is on a white list of authorised access points for use with the network; wherein if the access point is on the white list, the personal device is allowed to access the network via the access point; and if the access point is not on the white list, the personal device is not allowed to access the network.

The personal device therefore cannot access the network unless it uses one of the authorised access points. Preferably the personal device is a BYOD, as previously explained.

According to an embodiment of a network server aspect, there is provided a network server arranged to allow secure access to the network from a personal device only via an authorised access point, the network server including a processor, memory and an external link out of the network; wherein the memory is arranged to store a white list of authorised access points for use with the network; the processor is arranged to establish an external connection to the personal device via the external link and an access point for the personal device; the processor is arranged to check whether the access point is on the white list; and if the access point is on the white list, to allow the personal device to access the network via the access point; or if the access point is not on the white list, not to allow the personal device to access the network.

The network experiences increased security as a result of only allowing personal device access via the authorised access point(s).

According to an embodiment of an access point aspect of the invention there is provided an authorised access point arranged to allow a personal device to access a network securely, the access point including an identification of the access point, a processor, and access means for connection to the network and the personal device; wherein the processor is arranged to establish a connection between the network and the personal device via the access means; the processor is arranged to transmit the identification of the access point when requested, for checking the network whether the access point is on a white list of authorised access points for use with the network; and wherein if the access point is on the white list, the access point is arranged to allow a secure connection between the personal device and the network; whereas if the access point is not on the white list, the access point cannot provide secure access to the network.

Separate method aspects for each of these individual network components (device, AP and server) are also provided, with method steps carried out by the network components as set out for the apparatus aspects.

According to an embodiment of a VPN aspect of the present invention there is provided a Virtual Private Network VPN including a personal device, an access point and a private network server, wherein the personal device and network server are arranged to communicate under a full VPN session via the access point; and wherein the network server includes a white list of authorised access points for use with the network the access point being on the white list.

According to another embodiment of a VPN aspect of the present invention there is provided a VPN linking the personal device previously described, the access point previously described and the network server previously described.

According to a computer program aspect there may be provided a computer program which when executed on processors (or controllers) of a personal device, access point and/or network server carries out the method as defined in any of the previous described methods. A further computer program aspect may provide a computer program which when executed on a processor (or controller) of the device or access point or network server causes it to function as defined in either of the base station aspects.

Features and sub-features of any of the different aspects of the invention may be freely combined. For example, preferred embodiments of the device, access point, network server or VPN may be configured to incorporate functionality corresponding to one or more preferred features of the method aspect.

The invention can be implemented in computer hardware, firmware, software, or in combinations of them. The invention can be implemented as a computer program or computer program product, i.e., a computer program tangibly embodied in an information carrier, e.g., in a machine-readable storage device or in a propagated signal, for execution by, or to control the operation of, one or more hardware modules.

A computer program can be in the form of a computer program portion or more than one computer program and can be written in any form of programming language, including compiled or interpreted languages, and it can be deployed in any form, including as a stand-alone program or as a module, component, subroutine, or other unit suitable for use in a data processing environment. A computer program can be deployed to be executed on one module or on multiple modules at one site or distributed across multiple sites and interconnected by a communication network.

Method steps of the invention can be performed by one or more programmable processors executing a computer program to perform functions of the invention by operating on input data and generating output. Each processor may have one or more cores.

Processors/controllers suitable for the execution of a computer program include, by way of example, both general and special purpose microprocessors, and any one or more processors of any kind of digital or biological computer. Generally, a processor will receive instructions and data from a read-only memory or a random access memory or both.

The invention is described in terms of particular embodiments. Other embodiments are within the scope of the following claims. For example, the steps of the invention can be performed in a different order and still achieve desirable results.

The apparatus according to preferred embodiments is described as configured, operable or arranged to carry out certain functions. This configuration or arrangement could be by use of hardware or middleware or any other suitable system. In preferred embodiments, the configuration or arrangement is by software.

BRIEF DESCRIPTION OF THE DRAWINGS

The invention will now be described with reference to specific non-limiting embodiments as shown in the drawings, in which.

DETAILED DESCRIPTION OF THE PREFERRED EMBODIMENTS

Figure 1:
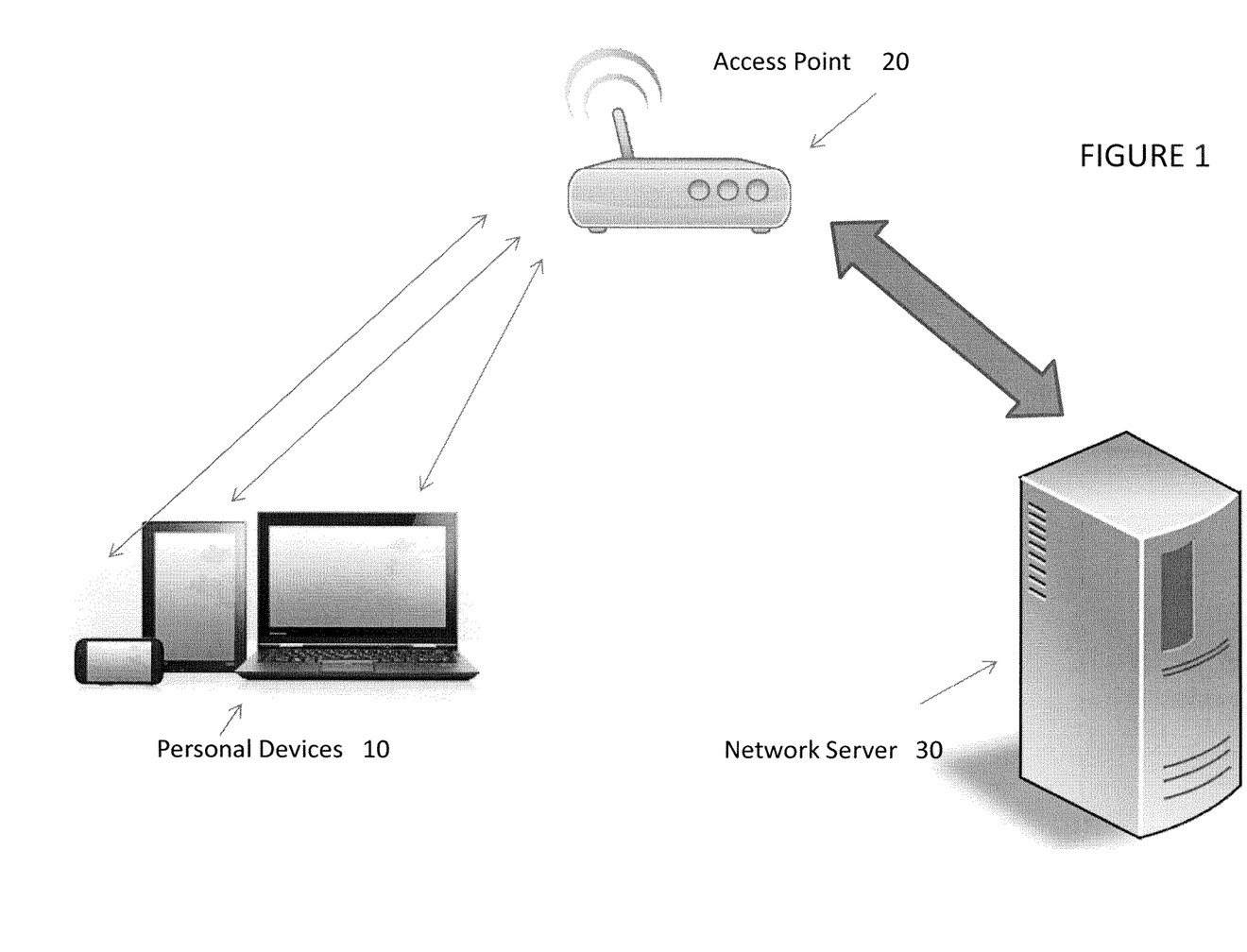
FIG. 1 is a schematic diagram showing links between personal devices, and access point and a network.

FIG. 1 illustrates the components in an embodiment of the invention. Personal devices or BYODs 10 are linked wirelessly to an access point or AP 20, which provides the connection between the BYODs and a network (of which the network server 30 only is shown). In invention embodiments, the access point must be on a network white list (which may be stored anywhere on the network but is available to the network server) in order to allow the BYODs to connect to the network.

Figure 2:
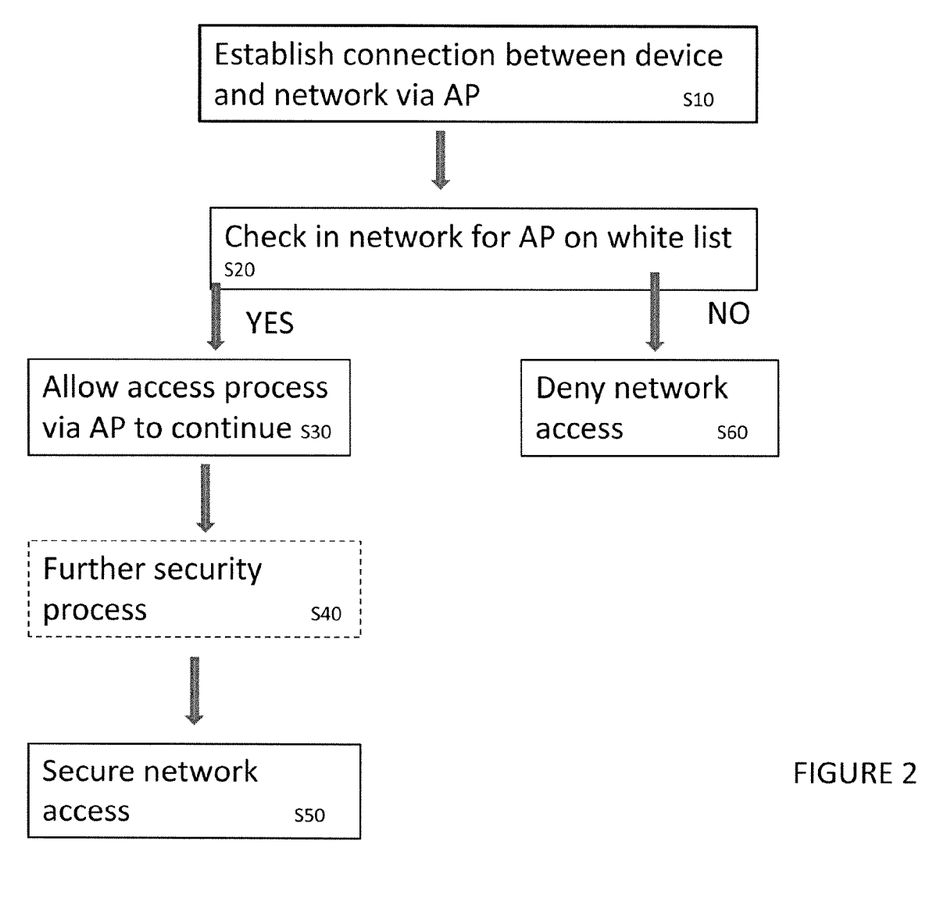
FIG. 2 is a flowchart illustrating a general embodiment of the invention.

FIG. 2 is a flowchart of a general invention embodiment. In step S10 a connection is established between the network and the personal device via the AP. This connection is not yet a secure link to network contents, such as a VPN session, but allows the network to check in step S20 whether the AP is on a list of authorised APs. If it is (YES) then in step S30 the access procedure may continue via this AP. Access may be granted directly at this stage. Alternatively, there may be further security checks in step S40 (these may have already been carried out if they are not used at this stage in the procedure). In step S50, and presuming any further checks are also successful, secure network access commences.

If the access point is not on the white list (NO) then no network access is permitted via this AP, and access is thus denied in step S60.

Figure 3:
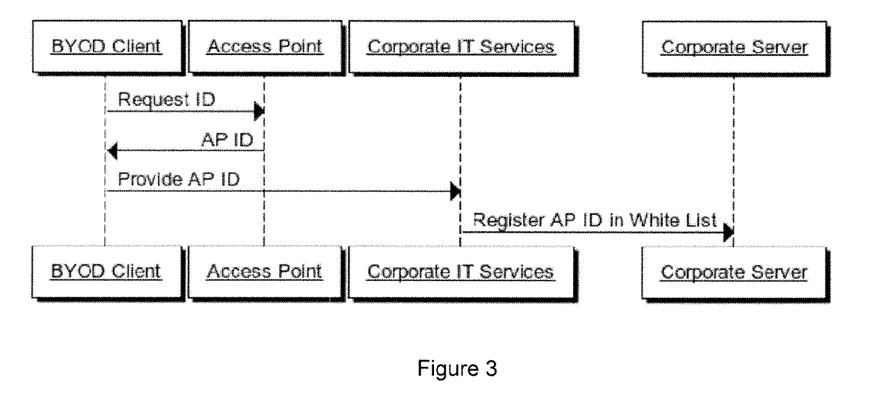
FIG. 3 is a signalling diagram showing the set-up phase of a white list entry.
Figure 4:
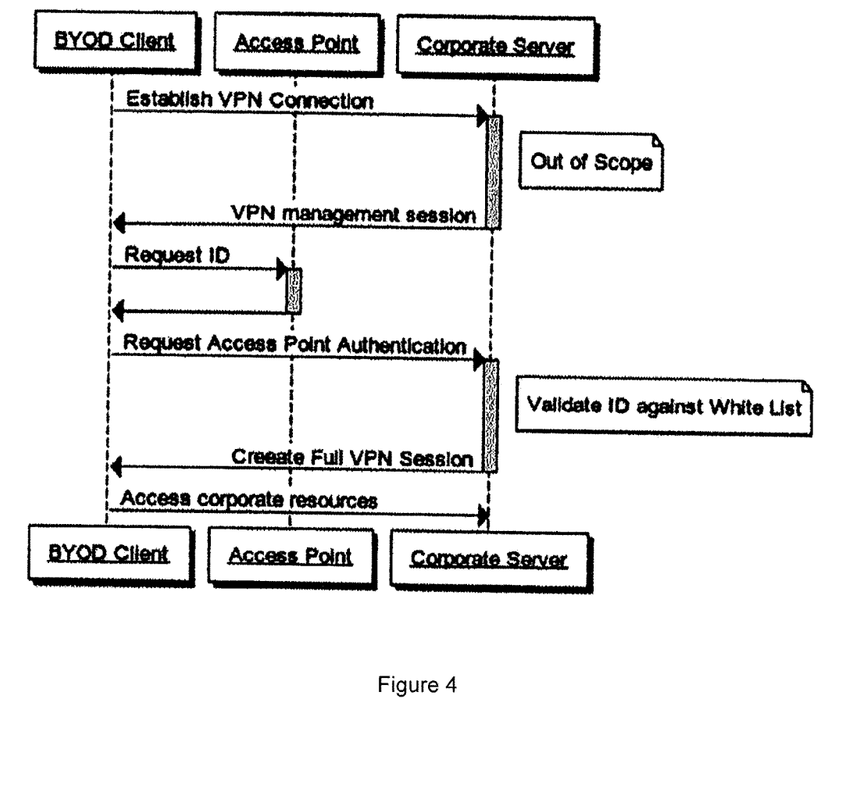
FIG. 4 is a signalling diagram showing successful connection to a corporate network.
Figure 5:
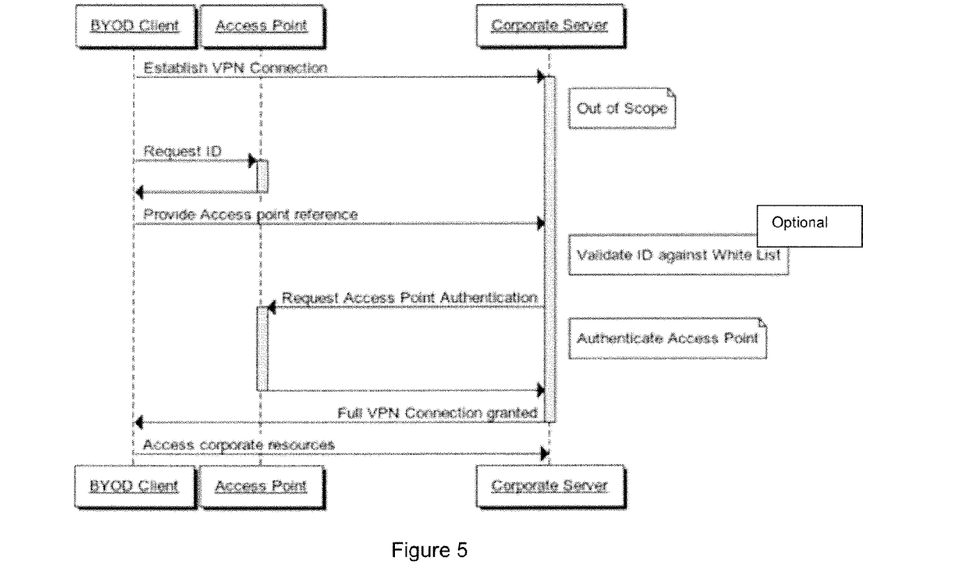
FIG. 5 is a signalling diagram showing an alternative successful connection to a corporate network.
Figure 6:
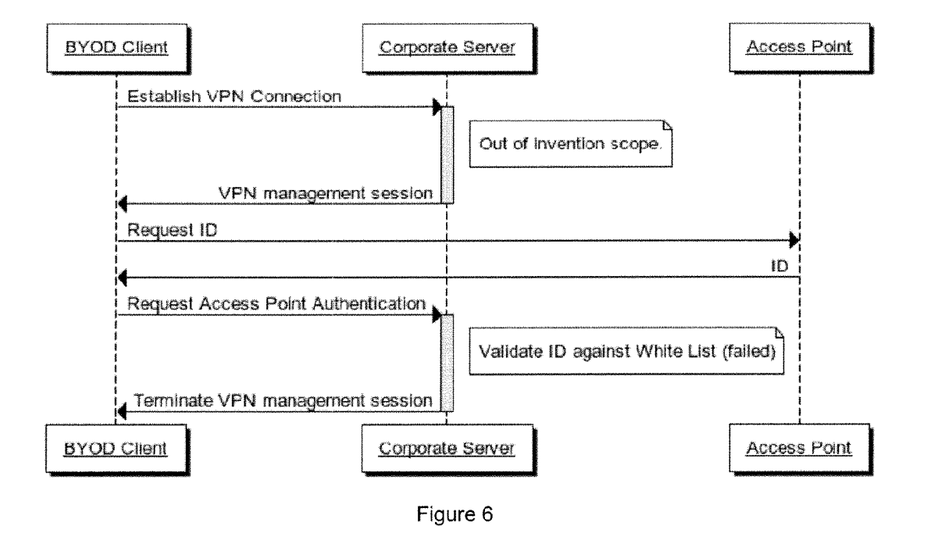
FIG. 6 is a signalling diagram showing failed connection to a corporate network.

FIGS. 3 to 6 show more detailed embodiments, in which secure access from a BYOD client to a corporate server is granted via a VPN. These invention embodiments involve an additional step in the process of establishing a VPN connection between the BYOD Client and the Corporate Server, beyond the known security mechanisms. They also require an initial set up stage. The sequence diagrams of FIGS. 3 to 6 outline these two processes. FIG. 3 shows the setup phase. FIG. 4 shows a successful access connection. FIG. 5 shows an alternative mechanism negotiating a successful connection. FIG. 6 shows a failed access connection.

As an aside, in all these diagrams, access to the corporate services is always via an AP. When an AP appears in the sequence diagrams it is acting as an agent in the protocol, for example to respond to requests. At other times it functions transparently as a network component and this role is not illustrated in the sequence diagrams. The thicker vertical sections in these diagrams are UML notation for processing required, rather than a simple exchange of data.

In FIG. 3, the BYOD client requests the AP ID, which is returned to the BYOD client. The BYOD client then sends this AP ID to corporate IT services, which register it in the white list held by a corporate server. The set-up process of FIG. 3 may take place in the corporate offices (in which case no further security may be required) or it may take place under a VPN session in which the BYOD accesses corporate resources and thus via an AP already registered on the white list.

The corporate IT services are shown separately from the server, and there is an important role separation here, and usually separate hardware, although this is not necessary. There is likely to be some used input during the interaction with corporate IT Services, for example the IT administration may have to approve the particular AP through some form of corporate policy. The final message from the BYOD providing the AP ID is sent via the network capability of the AP to the corporate IP service (where some approval must take place) and then to the Corporate server, where it is available for later use.

In FIG. 4, the BYOD is attempting to access the corporate network via an AP. Initially it establishes a VPN connection to establish a VPN management session. The VPN connection and VPN session management protocols are quite complex and there are many different implementations (including standards-based implementations) of which the skilled person will be aware. Further details are beyond the scope of this patent. For the purposes of these invention embodiments, the key point is the separation between the connection and the session, so that the AP ID is authenticated (and a full session authorised) before there is access to network resources, which may include all the corporate resources required for remote working, such as web access, email, corporate applications, back ups etc.

According to FIG. 4, the BYOD client first establishes a VPN connection with the corporate server (via the AP, but this is not illustrated, as mentioned above). The corporate server allows a VPN management session. The BYOD client requests the AP ID, which is sent by the AP, and then the BYOD client request AP authentication using the ID. The ID is validated against the white list and any other steps required for authorisation are carried out (or have already been carried out). The corporate server creates a full VPN session, which allows the BYOD client to access the corporate resources.

FIG. 5 shows an equivalent diagram, with a slightly different authentication and authorisation process for connection. Initially the BYOD client establishes a VPN connection with the corporate server and requests the AP ID as before. The BYOD then provides the AP reference to the corporate server, including enough information for the server to address (that is, find on the internet) the access point. The reference may include the ID information as well as the IP address of the AP. If the ID information is provided at this stage, there may be an initial validation against the white list, but full network access is not granted, even if the ID is on the white list.

The corporate server then requests authentication from the AP. The AP thus directly provides its authentication credentials to the server. This allows independent provision of the ID information or corroboration of the information provided by the BYOD client, which may be useful if the BYOD is insecure in some way. The AP provides authentication and the use of the AP is authorised (perhaps after further security checks), allowing a full VPN connection to be granted, so that the BYOD client can access corporate resources.

Both FIGS. 4 and 5 can be used with the set-up phase illustrated in FIG. 3. The FIG. 5 connection process may be viewed as potentially more secure or dynamic, because it allows the corporation more control, whereas the FIG. 4 process does not require that the AP is initially accessible from the company.

FIG. 6 shows the same connection process as FIG. 4, but in the case in which the validation against the white list fails, which leads to termination of the VPN management session.

The invention embodiments may use alternative forms of AP ID for authentication in either of the connection processes mentioned above, or in other connection processes.

AP Authentication Through Chip Level Identifier

In the first of two variants (generally the preferred variant) the access point ID is provided by the access point hardware, probably the micro-processor at the heart of the device. This is the preferable source of this ID, since it is an immutable attribute of the hardware and therefore cannot be spoofed.

AP Authentication Through Encrypted Data Certificates

In the second of these two variants the access point ID is provided by the access point based on a configured ID. This ID should be an encrypted field encrypted by a private key held by the corporation exploiting this invention. The public key is used to extract the ID at the validation step in the process.

An accompanying feature to enforce the solution of invention embodiments is the ability of the network (or the AP) to wipe clean the BYOD device after it accesses the network. This occurs when a device is leaving the authenticated AP coverage area or when it is being shut down. It will ensure that none of the secure data (corporate information) is retained in the device.

Another accompanying feature used to maintain the data security is that when a device connects to the server through an authenticated AP, for example using a 3G or 4G cellular mode, it (the device) is not allowed to be handed over (for example to the outside Macro cell network). If this handover is possible, a security breach can happen, as the devices can continue with server access and still roam in a wide area.

In one embodiment, whenever the device attempts a handover (change of APs), the source AP should indicate to the server the ID of the attempted destination AP. Then the server should check on the white list, if this AP is registered or not. If the AP is registered, the server should continue to provide access to this device. (This implies the device is moving inside the office (or other "safe zone"), moving into the coverage area of another office AP.) If the destination AP is not in the white list, the server should terminate the connection and optionally take steps to wipe clean the device of sensitive data.

Figure 7:
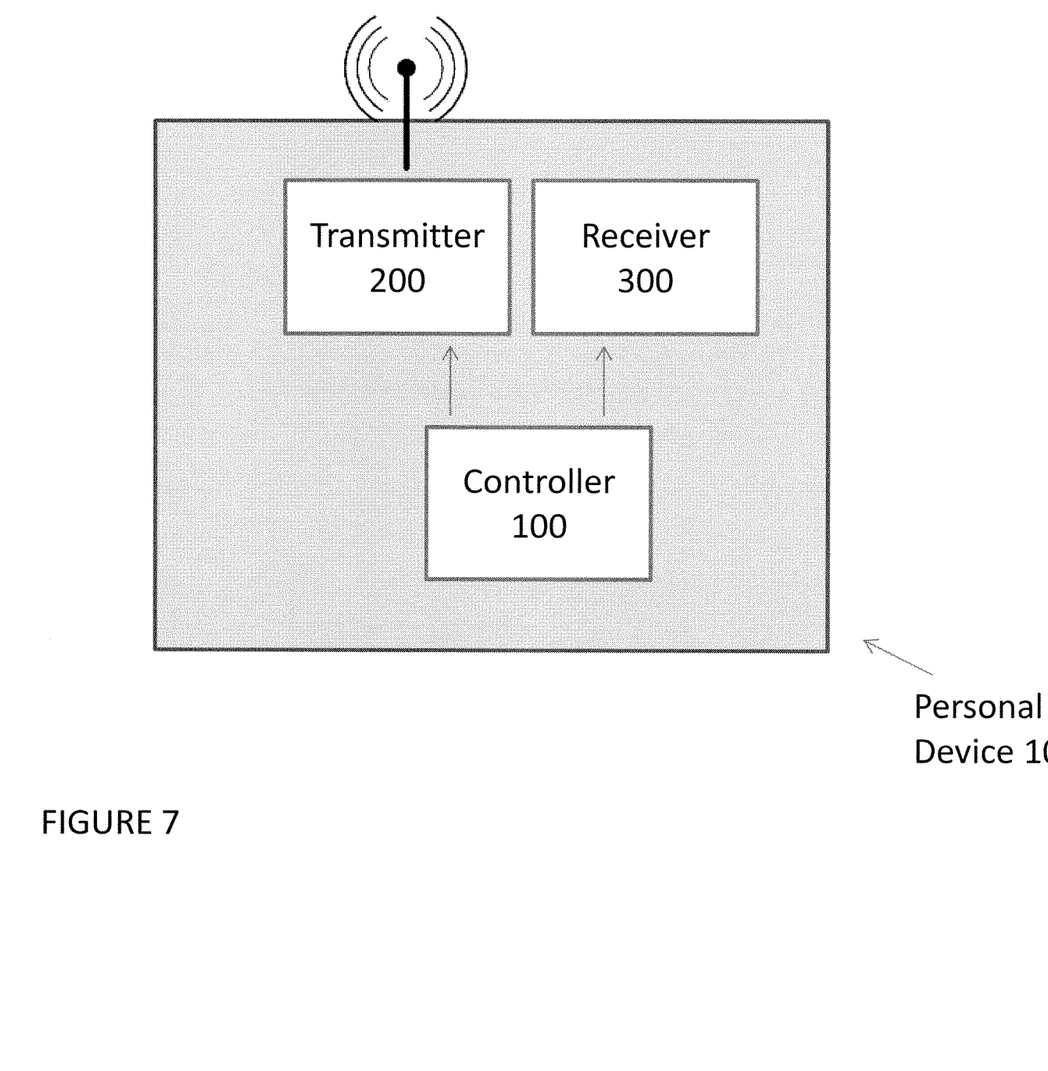
FIG. 7 is a schematic diagram of a personal device.

FIG. 7 is a block diagram of components in a personal device 10, which may function as a BYOD. A controller 100 controls operation of a transmitter 200 and receiver 300 (which may be provided together as a transceiver). The controller controls the transmitter and receiver to carry out the communication necessary for remote access of a network using the invention embodiments. It may include operational functionality for the device and extra functionality for further security checks etc.

Figure 8:
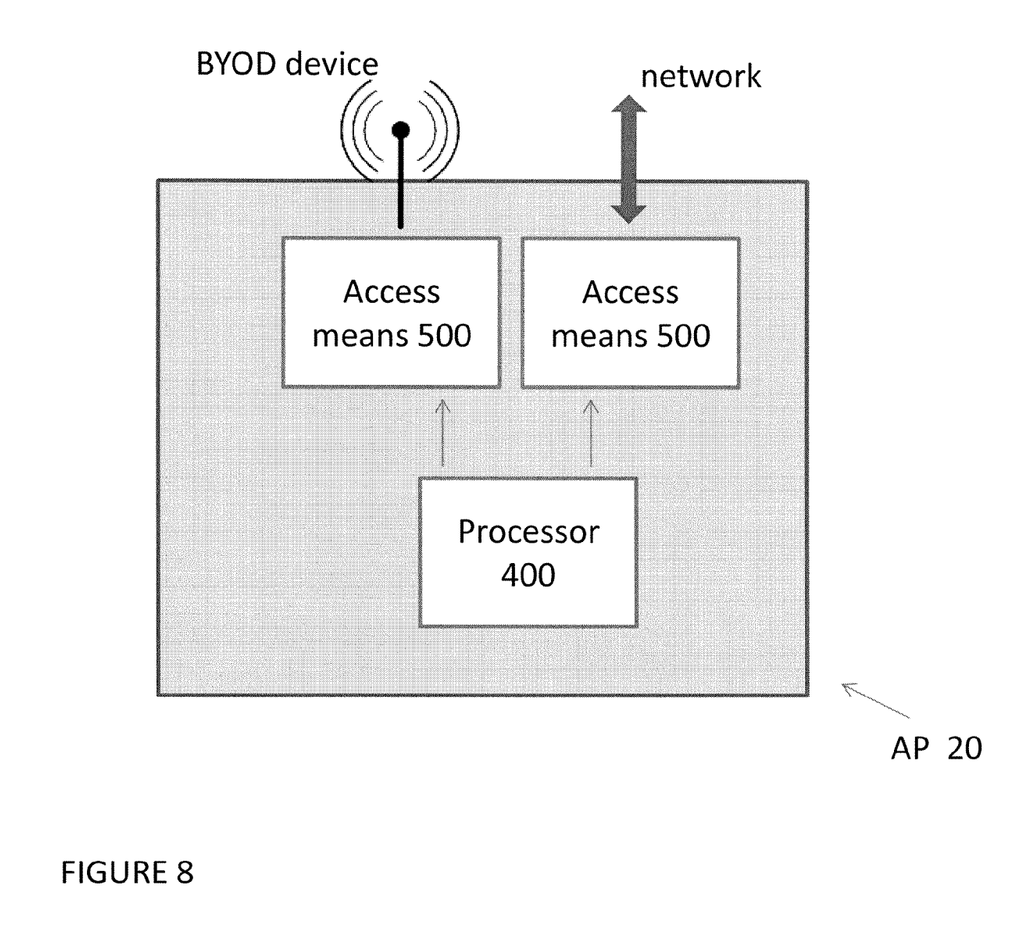
FIG. 8 is a schematic diagram of an access point.

FIG. 8 is a block diagram of an AP 20, including processor (or controller) 400 which controls access means 500. The access means are likely to be a transmitter/receiver or transceiver arrangement for connection to a personal device and a wired connection for the network, but other configurations are possible and the same access means could potentially be used for connection to the network and to the personal device.

Figure 9:
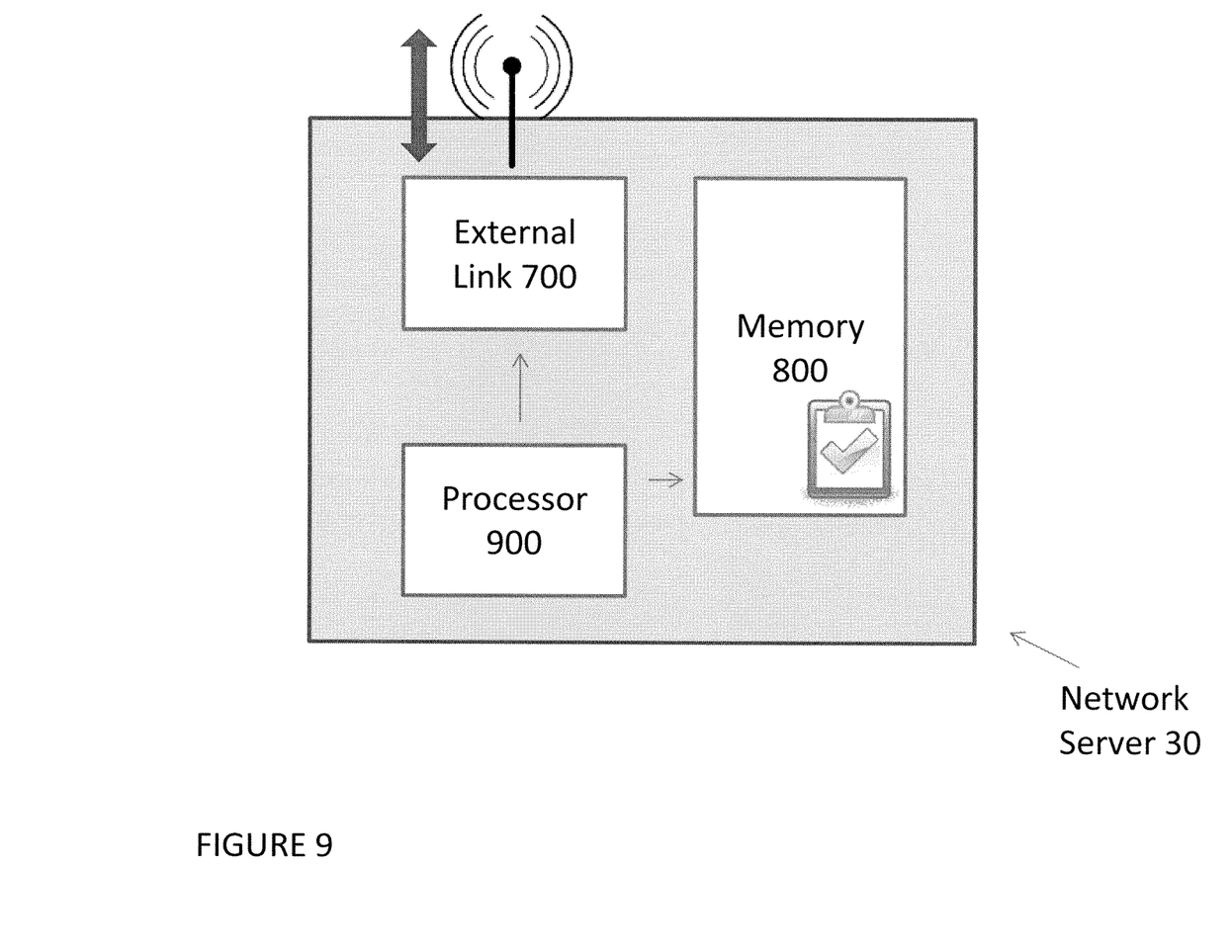
FIG. 9 is a schematic diagram of a network server.

FIG. 9 is a block diagram of a network server 30, including memory 800 which holds the white list, processor 900 controlling operations and an external link 700 (wireless or wired or both) to the personal device via the AP. Further components such as internal links to other network components are not shown.

Benefits of Invention Embodiments Over Alternate Solutions(s)

Other solutions to this security issue will probably be centred on stricter authentication of the user before access is allowed to the corporate network. This can include a 3 point check, i.e. device authentication with a certificate, user authentication with a password and a further bio-metric user authentication using a finger print or iris check etc. The benefits of invention embodiments over such solutions are:

Devices to provide bio-metric authentication can be expensive. As every user needs such a device, the overall cost of running the enterprise network will increase. Invention embodiments do not incur such additional costs.

Gaining access to the network can be time consuming and cumbersome with this additional security feature as it involves user procedures. Invention embodiments are transparent to the user and do not significantly increase the complexity of the network access process.

Having authentication responsibilities in two separated components heightens security because both of these entities have to be compromised in order for an intruder to gain access.

To summarize, embodiments of the invention look at the potential security risks for enterprise networks in implementing a BYOD (Bring Your Own Device) policy in the office and provides a novel solution. The BYOD policy allows employees to bring any personal device of their choice into the office and use it for official work. While it can improve the productivity of the employees and reduce the IT related costs for the enterprise, it can open up a series of issues related to secure handling of official data. The solutions of invention embodiments reduce these risks by limiting the number of access points through which the said BYOD devices can connect to the office network. These selective access points can be in the office, employee home and may also contain portable access points the employees can take with them. Some embodiments propose methodologies as to how the enterprise network can authenticate the access points (in addition to routine device authentication) in this solution.

The invention embodiments reduce the risk of a lost, stolen or spoofed BYOD device being used to gain unauthorised access to the secure office network. One of the big challenges for enterprise IT departments in future will be on how to ensure network security from un-authorised access in ways mentioned above. Current solutions for this issue are highly complex and costly, for example provision of three-way security including a bio-metric check on the user every time the network is accessed. The solution of invention embodiments is far simpler to implement and involves no additional complexity at the user end or additional work load for the IT services. While it can reduce the flexibility of network access from anywhere for the BYODs, it provides access for the most common work places (such as the office, home). It also enables IT departments to track the network access locations for every device, in case such a check becomes necessary.

The invention claimed is:

1. A computer-executed method of using a personal device to securely access a corporate server providing corporate services in a network, wherein personal devices can only access the server in the network via a restricted number of authorized access points, the method including:
   establishing a connection between the network and the personal device via an access point;
   checking in the network whether the access point is on a network white list of the restricted number of authorized access points for use with the server, wherein the network white list includes all the access points allowed for connection of personal devices to the server;

if the access point is on the network white list, allowing the personal device to access the server securely via the access point; and if the access point is not on the network white list, not allowing the personal device to access the server securely, wherein the network white list includes an access point identification for each authorized access point, and specific hours and/or days of authorization for one of some and all authorized access points, wherein secure access to the server is only granted if the network white list check is made during the specific hours and/or days of authorization for those authorized access points.

2. A method according to claim 1, further including a security check including at least a personal device check and a user check before secure access to the server is granted.

3. A method according to claim 1, wherein the access point identification includes an access point hardware ID, preferably of the access point microprocessor.

4. A method according to claim 1, wherein the access point identification includes a configured ID, preferably an encrypted field encrypted by a private key and extracted by a public key.

5. A method according to claim 1, wherein checking whether the access point is on the network white list includes:

the personal device requesting the access point identification from the access point, the access point providing the identification to the personal device; and optionally the personal device transmitting the access point identification to the network for comparison with the network white list.

6. A method according to claim 1, wherein, the network requests access point authentication from the access point, which is then transmitted directly to the network for comparison with the network white list before server access is granted.

7. A method according to claim 1, wherein once the personal device is accessing the server securely via the access point, if the personal device no longer accesses the server securely, any data downloaded from the network is cleared from the personal device memory.

8. A method according to claim 1, wherein while the personal device is accessing the server via the access point and a cellular communication system, the personal device is prevented from handover to outside the current cell, and preferably wherein the access point supplies the access point authentication of any new access point to the server, for comparison against the white list.

9. A method according to claim 1, wherein the access point is a portable access point, such as a portable router, portable internet connection to a cellular communication system or a portable base station for a femto cell.

10. A method according to claim 1, wherein the connection path between the personal device and the access point is wireless, whereas the connection path between the access point and the network is wired.

11. A method according to claim 1, including an initial set-up stage in which at least one access point is registered with the network and added to the list of authorized access points.

12. A method according to claim 1, wherein the connection between the server and the personal device is a VPN connection, and the personal device accesses the network if the access point is on the network white list using a full VPN connection or session.

13. A personal device which is arranged to access a corporate server providing corporate services in a network only via a restricted number of authorized access points, the personal device including:

a controller, a transmitter and a receiver; wherein the controller controls the transmitter and receiver:

to connect to the network via an access point; and to communicate with the access point and the network to check whether the access point is on a network white list of the restricted number of authorized access points for use with the server, wherein the network white list includes all the access points allowed for connected of personal devices to the server; wherein if the access point is on the network white list, the personal device is allowed to access the server via the access point; and if the access point is not on the network white list, the personal device is not allowed to access the server, wherein the network white list includes an access point identification for each authorized access point, and specific hours and/or days of authorization for one of some and all authorized access points, wherein secure access to the server is only granted if the network white list check is made during the specific hours and/or days of authorization for those authorized access points.

14. A corporate server in a network, and arranged to allow secure access to corporate services via the network from a personal device only via an authorized access point, the server including:

a processor, memory and an external link out of the network; wherein the memory is arranged to store a network white list of a restricted number of authorized access points, wherein the network white list includes all the access points allowed for connection of personal devices to the server;

the processor is arranged to establish an external connection to the personal device via the external link and an access point for the personal device;

the processor is arranged to check whether the access point is on the network white list; and if the access point is on the network white list, to allow the personal device to access the server via the access point; or if the access point is not on the network white list, not to allow the personal device to access the server, wherein the network white list includes an access point identification for each authorized access point, and specific hours and/or days of authorization for one of some and all authorized access points, wherein secure access to the server is only granted if the network white list check is made during the specific hours and/or days of authorization for those authorized access points.

15. An authorized access point arranged to allow a personal device to securely access a corporate server providing corporate services in a network, the access point including:

an identification of the access point, a processor, and access means for connection to the network and the personal device; wherein the processor is arranged to establish a connection between the network and the personal device via the access means;

the processor is arranged to transmit the identification of the access point when requested, for checking whether the access point is on a network white list of a restricted number of authorized access points for use with the corporate server, wherein the network white list includes all the access points allowed for connection of personal devices to the server and wherein if the access point is on the network white list, the access point is arranged to allow a secure connection between the personal device and the corporate server; whereas if the access point is not on the network white list, the access point cannot provide secure access to the server, wherein the network white list includes an access point identification for each authorized access point, and specific hours and/or days of authorization for one of some and all authorized access points, wherein secure access to the server is only granted if the network white list check is made during the specific hours and/or days of authorization for those authorized access points.

16. A Virtual Private Network VPN including, a personal device, an access point and a corporate network server, wherein the personal device and corporate server are arranged to communicate under a full VPN session via the access point; and the corporate network server includes a network white list of authorized access points for use with the server; wherein the network white list includes all the access points allowed for connection of personal devices to the server, the access point being on the network white list, the corporate server is arranged to check whether the access point is on the network white list; and if the access point is on the network white list, to allow the personal device to access the corporate server via the access point; or if the access point is not on the network white list, not to allow the personal device to access the corporate server, wherein the network white list includes an access point identification for each authorized access point, and specific hours and/or days of authorization for one of some and all authorized access points, wherein secure access to the corporate network server is only granted if the network white list check is made during the specific hours and/or days of authorization for those authorized access points.

\* \* \* \* \*